(12) United States Patent
Lee et al.

(10) Patent No.: US 7,313,116 B2
(45) Date of Patent: Dec. 25, 2007

(54) METHOD OF PERFORMING INTER-RAT MEASUREMENT FOR A HANDOVER FROM NB-TDD TO GSM

(75) Inventors: Kook-Heui Lee, Songnam-shi (KR);
Hyeon-Woo Lee, Suwon-shi (KR);
Sung-Ho Choi, Songnam-shi (KR);
Joon-Goo Park, Seoul (KR);
Jeong-Gon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 817 days.

(21) Appl. No.: 10/437,371

(22) Filed: May 13, 2003

(65) Prior Publication Data
US 2004/0002334 A1    Jan. 1, 2004

(30) Foreign Application Priority Data
May 13, 2002   (KR) .................... 10-2002-0026287
May 14, 2002   (KR) .................... 10-2002-0026492

(51) Int. Cl.
*H04B 7/216*   (2006.01)
*H04Q 7/20*    (2006.01)

(52) U.S. Cl. ...................... 370/335; 455/437

(58) Field of Classification Search ........ 370/328–329, 370/331, 332, 335, 370, 508; 455/436–440, 455/442–443, 452.1–452.2
See application file for complete search history.

(56) References Cited

U.S. PATENT DOCUMENTS

| 6,044,272 | A   |   | 3/2000 | Kobylinski et al. |
| 6,438,117 | B1  | * | 8/2002 | Grilli et al. ................. 370/331 |
| 6,845,238 | B1  | * | 1/2005 | Muller ....................... 455/436 |
| 7,003,296 | B2  | * | 2/2006 | de Montgolfier ........... 455/436 |

* cited by examiner

*Primary Examiner*—Duc M. Nguyen
*Assistant Examiner*—Michael Thier
(74) *Attorney, Agent, or Firm*—The Farrell Law Firm (57) ABSTRACT

A method of performing an inter-RAT measurement for a handover from NB-TDD to GSM is provided. A UE, as it moves from an NB-TDD Node B to a GSM cell, receives a measurement control message from the NB-TDD Node B. The UE then measures the strength of a signal received from the GSM cell and verifies its identification for a predetermined measuring time. If the UE successfully verifies the identification of the GSM cell for the measuring time, it reports the signal strength measurement and the verified GSM cell identification to the NB-TDD Node B. If the UE fails to verify the identification of the GSM cell for the measuring time, it reports only the signal strength measurement to the NB-TDD Node B.

25 Claims, 9 Drawing Sheets

METHOD OF PERFORMING INTER-RAT MEASUREMENT FOR A HANDOVER FROM NB-TDD TO GSM

PRIORITY

This application claims priority under 35 U.S.C. §119 to an application entitled "Method of Performing Inter-RAT Measurement for Handover from NB-TDD to GSM" filed in the Korean Intellectual Property Office on May 13, 2002 and assigned Serial No. 2002-26287 and an application entitled "Method of Performing Inter-RAT Measurement for Handover from NB-TDD to GSM" filed in the Korean Intellectual Property Office on May 14, 2002 and assigned Serial No. 2002-26492, both contents of which are incorporated herein by reference.

BACKGROUND OF THE INVENTION

1. Field of the Invention

The present invention relates generally to a method of performing a handover between heterogeneous mobile communication systems, and in particular, to a method of measuring received signal strength and maintaining synchronization for a handover between heterogeneous mobile communication systems.

2. Description of the Related Art

In general, a $3^{rd}$ generation (3G) mobile communication system refers to a CDMA (Code Division Multiple Access) mobile communication system that supports packet service and voice service. CDMA systems are categorized into asynchronous CDMA, i.e. 3GPP ($3^{rd}$ Generation Project Partnership) or UMTS (Universal Mobile Telecommunication System), adopted in Europe, and synchronous CDMA, i.e. 3GPP2 or CDMA2000, deployed in the United States. The 3GPP has proposed FDD (Frequency Division Multiplexing) that distinguishes downlink (DL) transmission/reception from uplink (UL) transmission/reception by frequency, and TDD (Time Division Duplexing) that distinguishes DL transmission/reception from UL transmission/reception by time. The TDD is further branched into WB-TDD (Wide Band-TDD) using 3.84 Mcps and NB-TDD (Narrow Band-TDD) using 1.28 Mcps.

$2^{nd}$ generation (2G) mobile communication systems include GSM (Global System for Mobile communications) and IS (Interim Standard)-95. The GSM, which was deployed throughout Europe in 1992, provides service in TDMA (Time Division Multiple Access). Meanwhile, the IS-95, which was deployed in Korea and the U.S., provides service in CDMA.

As described above, the 2G and 3G mobile communication systems employ different frequencies and communication schemes. Such heterogeneous systems may be in service in adjacent areas. Specifically, as the 3G mobile communication systems have been in service, the service areas of FDD, WB-TDD, NB-TDD, GSM, CDMA2000, and IS-95 occasionally lie adjacent to each other or overlap with each other.

One significant feature of the 3G mobile communication systems is supporting global roaming irrespective of communication scheme or frequency. This implies that a handover to a different 2G system or to a different 3G generation system is supported. When a UE (User Equipment) moves from one service area to another using a different communication scheme or frequency, a handover is essential for global roaming.

As the above various communication services have been in service, there is a need for a method of performing a handover between heterogeneous mobile communication systems using different communication schemes and frequencies.

Handover between service areas using different communication schemes is defined as "inter-RAT (inter-Radio Access Technologies) handover," and monitoring the states of Node Bs for the inter-RAT handover is termed "inter-RAT measurement." Different frequencies can be used between neighbor Node Bs using the same communication scheme. Handover between these Node Bs is defined as "inter-frequency handover" and monitoring the states of the Node Bs for the inter-frequency handover is called "inter-frequency measurement".

Inter-frequency or inter-RAT measurements are performed in various ways in the 3G mobile communication systems. One way is that a UE discontinues communication with a serving Node B for a predetermined time and measures a downlink channel received in a different frequency band or belonging to a different radio access technology. Another way is that the UE transmits data at a higher rate and measures the downlink channel for the spared time. A third way is that the UE measures the downlink channel, continuing the ongoing call at a lower rate, thus with a degraded data quality.

The above-described inter-frequency and inter-RAT measurement methods are applied differently depending on whether a 3G mobile communication system identifies downlink/uplink transmission/reception by frequency or by time. Particularly, when the downlink transmission is distinguished from the uplink transmission by time, the UE carries out an inter-frequency or inter-RAT measurement for a non-downlink/uplink transmission period.

Figure 1A:
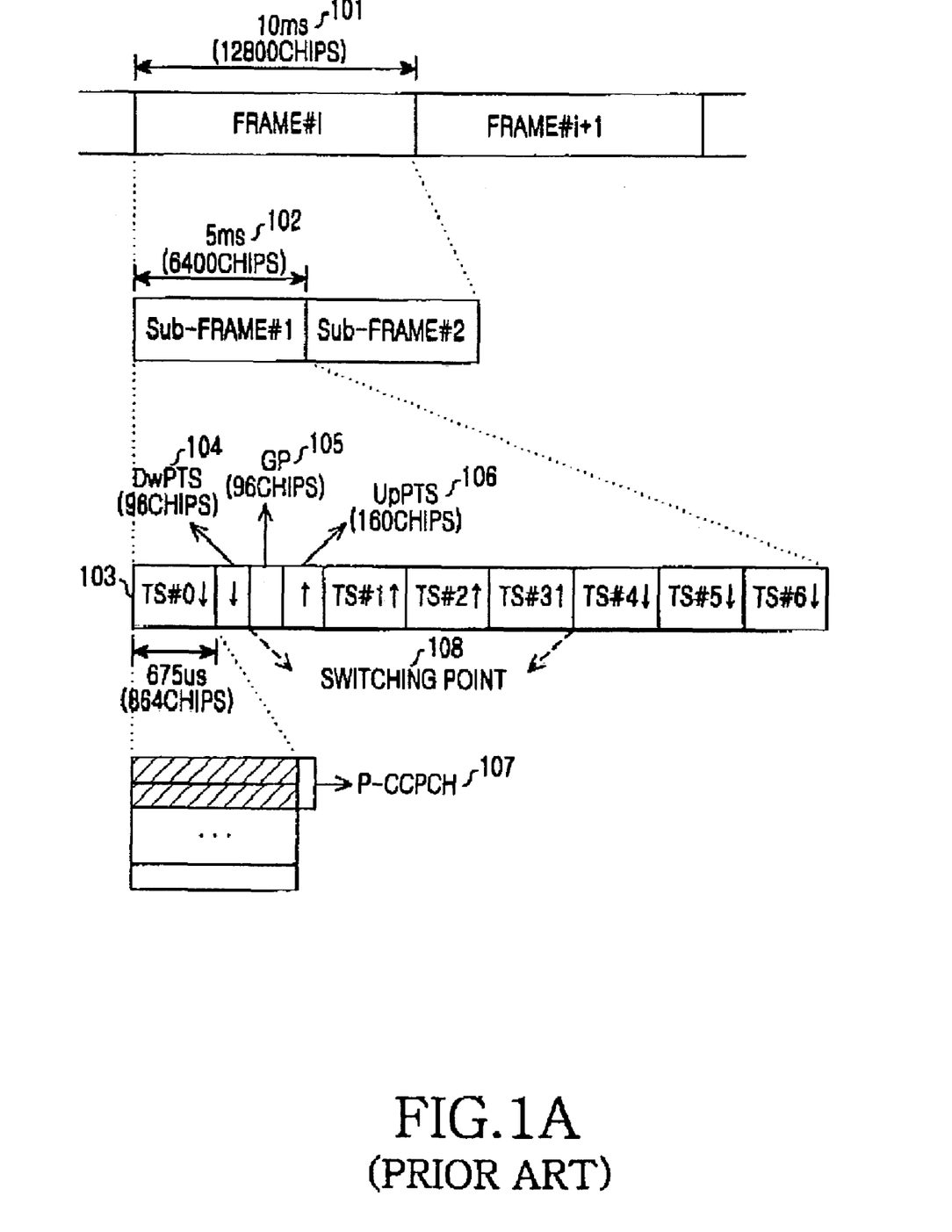
FIG. 1A illustrates a structure of a conventional NB-TDD frame.

FIG. 1A illustrates a structure of a typical NB-TDD frame. Referring to FIG. 1A, an NB-TDD frame 101 is 10 ms in duration, containing 12,800 chips in view of the data rate used in NB-TDD, 1.28 Mcps. The NB-TDD frame 101 is divided into two 5-ms sub-frames of the same structure. A sub-frame 102 is comprised of 7 time slots (TSs), a DL pilot time slot (DWPTS) 104, a UL pilot time slot (UpPTS) 106, and a guard period (GP) 105. Each TS includes 864 chips. The 7 TSs are used for uplink (UL) transmission or downlink (DL) transmission. For example, ↑ denotes UL TSs and ↓ denotes DL TSs. The number of UL TSs and the number of DL TSs in a sub-frame are determined according to the ratio of DL data rate to UL data rate in the system. The first TS (TS #0) 103 is always a DL TS and the second TS (TS #1) is always a UL TS. The 96-chip DwPTS 104, the 96-chip GP 105, and the 160-chip UpPTS 106 are interposed between TS #0 and TS #1. The DwPTS 104 is used for initial cell search, synchronization to system timing, and channel estimation in a UE. The UpPTS 106 is used for channel estimation and UL synchronization in a Node B. The GP 105 eliminates interference caused by multipath delay between transmissions of the DwPTS 104 and the UpPTS 106. In an NB-TDD system, a switching point is defined for transition between the UL and DL transmissions and two switching points are set in one sub-frame. A first switching point is fixed between the DwPTS 104 and the UpPTS 106 and a second switching point is at an appropriate position between TS #1 and TS #6 according to the ratio of DL data rate to UL data rate. A primary common control physical channel (P-CCPCH) 107 is delivered using two codes in TS #0. DL channels (or UL channels) sharing the same TS are identified by their codes in the NB-TDD system. These codes are orthogonal codes of length 16.

Figure 1B:
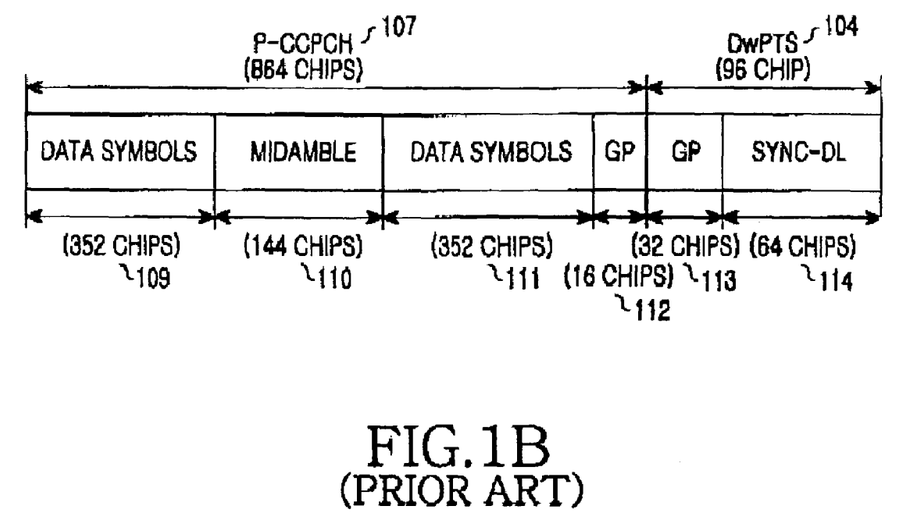
FIG. 1B illustrates structures of the first TS and a DwPTS illustrated in FIG. 1A.

FIG. 1B illustrates the P-CCPCH in TS#0 and the DwPTS. Referring to FIG. 1B, a P-CCPCH 107, which is a physical channel delivering a broadcasting channel (BCH) containing system information about a Node B, is comprised of a first data area 109, a midamble 110, a second data area 111, and a GP 112. The GP 112 is positioned at the end of TS #0 and includes 16 chips. The GP 112 eliminates interference from a signal in an adjacent TS. The DwPTS 104 is comprised of a GP 113 and a SYNC-DL (synchronization-downlink) code 114. The GPs 112 and 113 collectively form a 48-chip guard period to eliminate interference caused by multipath delay between TS#0 and the DwPTS 104. This guard period is relatively long because the SYNC-DL code 114 plays a very significant role. The SYNC-DL code 114 is the first signal for the UE to search for when the UE is in the service area of the NB-TDD communication system. The SYNC-DL code 114 is used for initial cell search and synchronization to a searched cell. When signals in TS #0 cause interference, the interference may have serious influence on reception of the SYNC-DL code 114. Thus, the GPs 112 and 113 are formed to have 48 chips to guarantee stable reception of the SYNC-DL code 114 in the UE. 32 SYNC-DL codes are available. The UE decides the SYNC-DL code 114 by correlating the 32 available SYNC-DL codes with a current strongest received signal and synchronizes its timing to a cell that the UE belongs to.

Figure 2A:
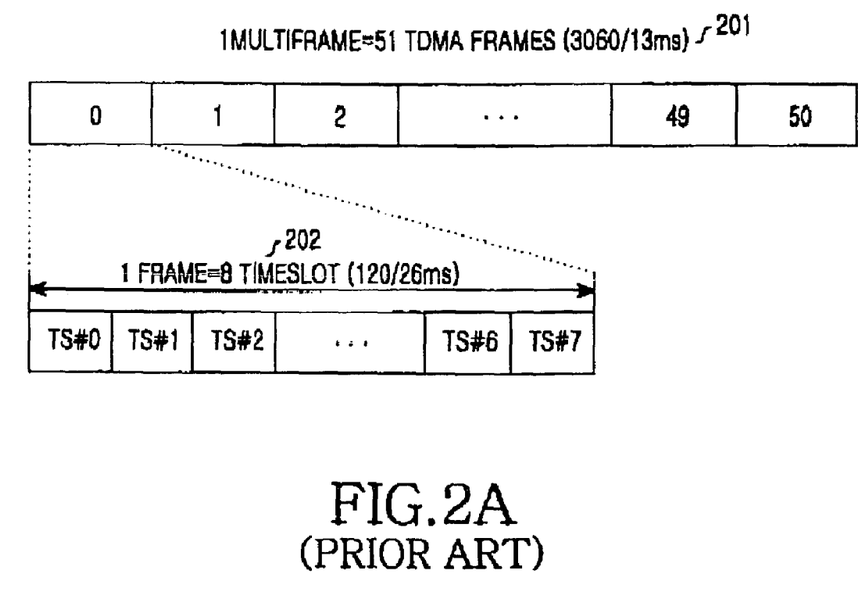
FIG. 2A illustrates a structure of a typical GSM frame.
Figure 2B:
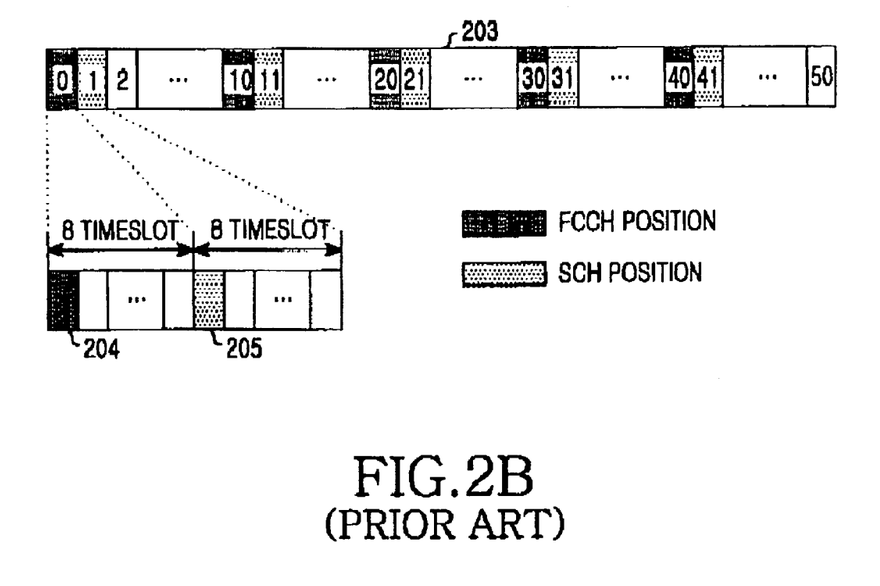
FIG. 2B illustrates FCCH positions and SCH positions in frames illustrated in FIG. 2A.
Figure 2C:
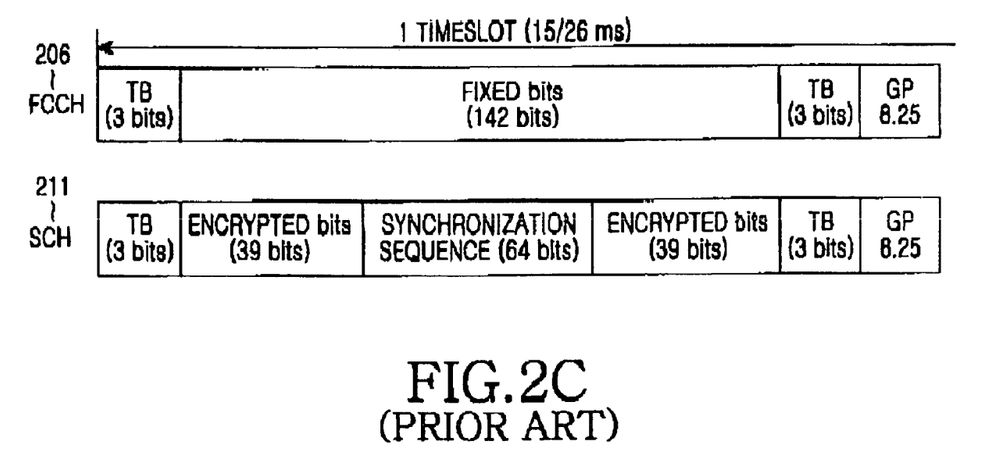
FIG. 2C illustrates structures of an FCCH and an SCH illustrated in FIG. 2B.

FIG. 2A illustrates a structure of a typical GSM frame, FIG. 2B illustrates FCCH (Frequency Correction Channel) positions and SCH (Synchronization Channel) positions in GSM frames, and FIG. 2C illustrates structures of an FCCH and an SCH illustrated in FIG. 2B. The FCCH and the SCH are used to acquire a GSM frequency and synchronize to system timing.

The GSM system is a major asynchronous 2G mobile communication system adopting TDMA. Referring to FIG. 2A, a multiframe 201 is the largest radio transport unit containing 51 frames in the GSM system. Each frame 202 has 8 TSs.

The GSM system uses the FCCH and the SCH to perform measurements for initialization and handover and to acquire synchronization between a UE and a Node B. Referring to FIG. 2B, the FCCH is delivered in the first TS 204 of each of frame #0, frame #10, frame #20, frame #30, and frame #40 among 51 frames 203. The SCH is delivered in the first TS 205 of each of frame #1, frame #11, frame #21, frame #31, and frame #41 among the 51 frames 203.

The structures of the FCCH 206 and the SCH 211 are illustrated in more detail in FIG. 2C. Referring to FIG. 2C, a SCH 211, which supplies a UE with training sequence it needs to be able to demodulate the information coming from the Node B is comprised of two TB (Tail Bit) slots 212 216, two Encrypted Bit slots 213 215, a synchronization sequence 214, and a GP(Guard Period) 217. The TB slots 212 216 consists of three bits at the beginning and the end of the SCH 211 and is used as guard time. The Encrypted Bit slots 213 215 contain the actual transmitted signaling data or user data. Also, a FCCH 206, which provides a UE with the frequency reference of the system is comprise of two TB (Tail Bit) slots 207 209, a Fixed Bit sequence 208, and GP 210. The Fixed Bit sequence 208 is transmitted in the time slot to provide the means for a mobile station to synchronize with the master frequency of the system.

Figure 3:
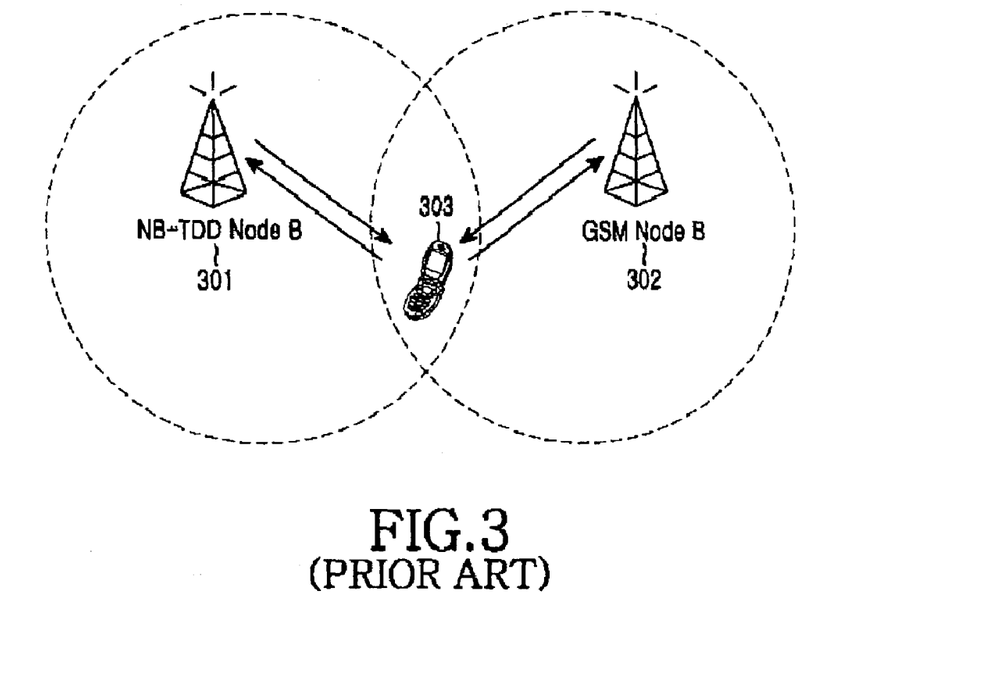
FIG. 3 illustrates a typical situation requiring inter-RAT measurement.

FIG. 3 illustrates a situation requiring inter-RAT measurement. Referring to FIG. 3, a UE 303, which is capable of communicating in an NB-TDD system and other systems, moves to a GSM Node B 302 during exchanging voice or packets with an NB-TDD Node B 301. For a handover from the NB-TDD system to the GSM system, the UE needs to perform inter-RAT measurements. As the UE 303 moves to the GSM Node B 302, it receives an inter-RAT measurement command from the NB-TDD Node B 301 and measures the strengths of signals from the GSM Node B 302. The signals can be the FCCH, the SCH, or a transport channel illustrated in FIGS. 2A, 2B, and 2C. The NB-TDD Node B 301 issues the inter-RAT command when the signal strengths from neighbor Node Bs measured in an NB-TDD frequency band at the UE 303 are insufficient for a handover, or the strengths of signals between the UE 303 and the NB-TDD 301 become weak.

After acquiring synchronization to the GSM Node B 302 and GSM system information from signal measurements on the GSM Node B 302, the UE 303 reports the signal measurements to the NB-TDD Node B 301 and continues the ongoing communication by the handover to the GSM Node B 302 according to a command from the NB-TDD Node B 301. In this case, the UE 303 already has a call established with the NB-TDD Node B 301 and has received an inter-RAT measurement command from it. However, if a call has not been established, the UE 303 can directly perform the inter-RAT measurement using necessary information in system information included in the BCH, which the NB-TDD Node B 301 delivers on the P-CCPCH.

Figure 4:
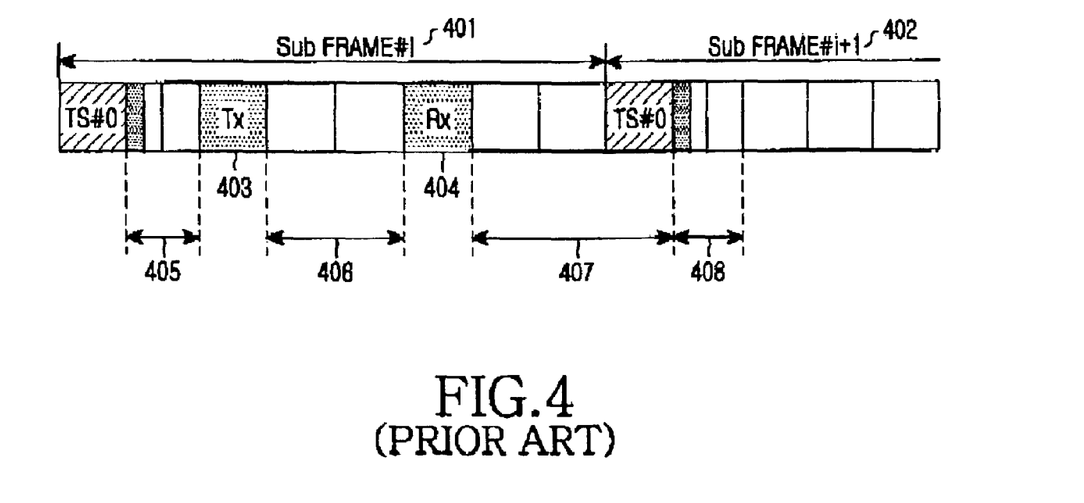
FIG. 4 illustrates inter-RAT measurement available TSs in a conventional NB-TDD mobile communication system.

FIG. 4 illustrates time periods when inter-RAT measurement is available in a UE supporting NB-TDD and other mobile communication schemes in the situation illustrated in FIG. 3. Referring to FIG. 4, reference numeral 401 denotes an ith sub-frame. In the ith sub-frame 401, the UE carries out UL transmission in a TS 403 and a Node B carries out DL transmission in a TS 404. The UE can carry out an inter-RAT measurement in the other TSs, that is, TSs 405, 406, 407, and 408.

However, the inter-RAT measurement is available only in TSs except for a radio frequency transition time for which the UE transitions its transmission/reception frequency to a frequency band for transmitting/receiving an inter-RAT signal and another radio frequency transition time for which the UE returns to its original frequency band. Therefore, the measurement time is TSs 405 to 408 except for the radio frequency transition times. As the measurement time is longer, the inter-RAT measurement is facilitated and measurement reliability is increased. In FIG. 4, the measurement time is determined according to the positions of DL TSs and UL TSs. If the measurement time is long, the inter-RAT measurement is reliably done. However, if the measurement time is short, the inter-RAT measurement may not be performed reliably.

Table 1 below illustrates time required for the UE to monitor the FCCH and the SCH with respect to the radio frequency transition time when the TS#1 and TS#5 illustrated in FIG. 1A are assigned to the UE.

TABLE 1

| TS1:UL, TS5:DL | Average sync time of monitoring FCCH + SCH (ms) | Average sync time of monitoring only FCCH (ms) |
| --- | --- | --- |
| 0.5 ms switching time | 512 | 288 |
| 0.6 ms switching time | measurement failure probability: 35.47% | Measurement failure probability: 35.47% |
| 0.7 ms switching time | measurement failure probability: 87.50% | Measurement failure probability: 87.50% |
| 0.8 ms switching time | Can never be synchronized (window is shorter than one FCCH timeslot) | |

TABLE 1-continued

| TS1:UL, TS5:DL | Average sync time of monitoring FCCH + SCH (ms) | Average sync time of monitoring only FCCH (ms) |
|---|---|---|
| 0.9 ms switching time | Can never be synchronized (window is shorter than one FCCH timeslot) | |
| 1.0 ms switching time | Can never be synchronized (window is shorter than one FCCH timeslot) | |

Referring to Table 1, the UE cannot monitor the FCCH and the SCH when the radio frequency transition time is 0.8 ms or longer.

Table 2 below illustrates time required for the UE to monitor the FCCH and the SCH with respect to the radio frequency transition time when TS#1 and TS#4 illustrated in FIG. 1A are assigned to the UE.

TABLE 2

| TS1:UL. TS4:DL | Average sync time of monitoring FCCH + SCH (ms) | Average sync time of monitoring only FCCH (ms) |
|---|---|---|
| 0.5 ms switching time | 336 | 185 |
| 0.6 ms switching time | 464 | 260 |
| 0.7 ms switching time | Measurement failure probability: 15.94% | Measurement failure probability: 15.94% |
| 0.8 ms switching time | measurement failure probability: 67.97% | Measurement failure probability: 67.97% |
| 0.9 ms switching time | Can never be synchronized (window is shorter than one FCCH timeslot) | |
| 1.0 ms switching time | Can never be synchronized (window is shorter than one FCCH timeslot) | |

Referring to Table 2, the UE cannot monitor the FCCH and the SCH when the radio frequency transition time is 0.9 ms or longer.

As noted from Table 1 and Table 2, it may occur that the UE cannot monitor the FCCH and the SCH at all according to the radio frequency transition time and its assigned slots. However, a UTRAN (UMTS Radio Access Network), which has commanded an inter-RAT measurement, currently has no information about the radio frequency transition time of the UE. Therefore, if the UTRAN fails to receive an inter-RAT measurement report from the UE, it cannot identify the cause, and thus, cannot take any corresponding action.

This situation will be described in more detail herein below.

Figure 8:
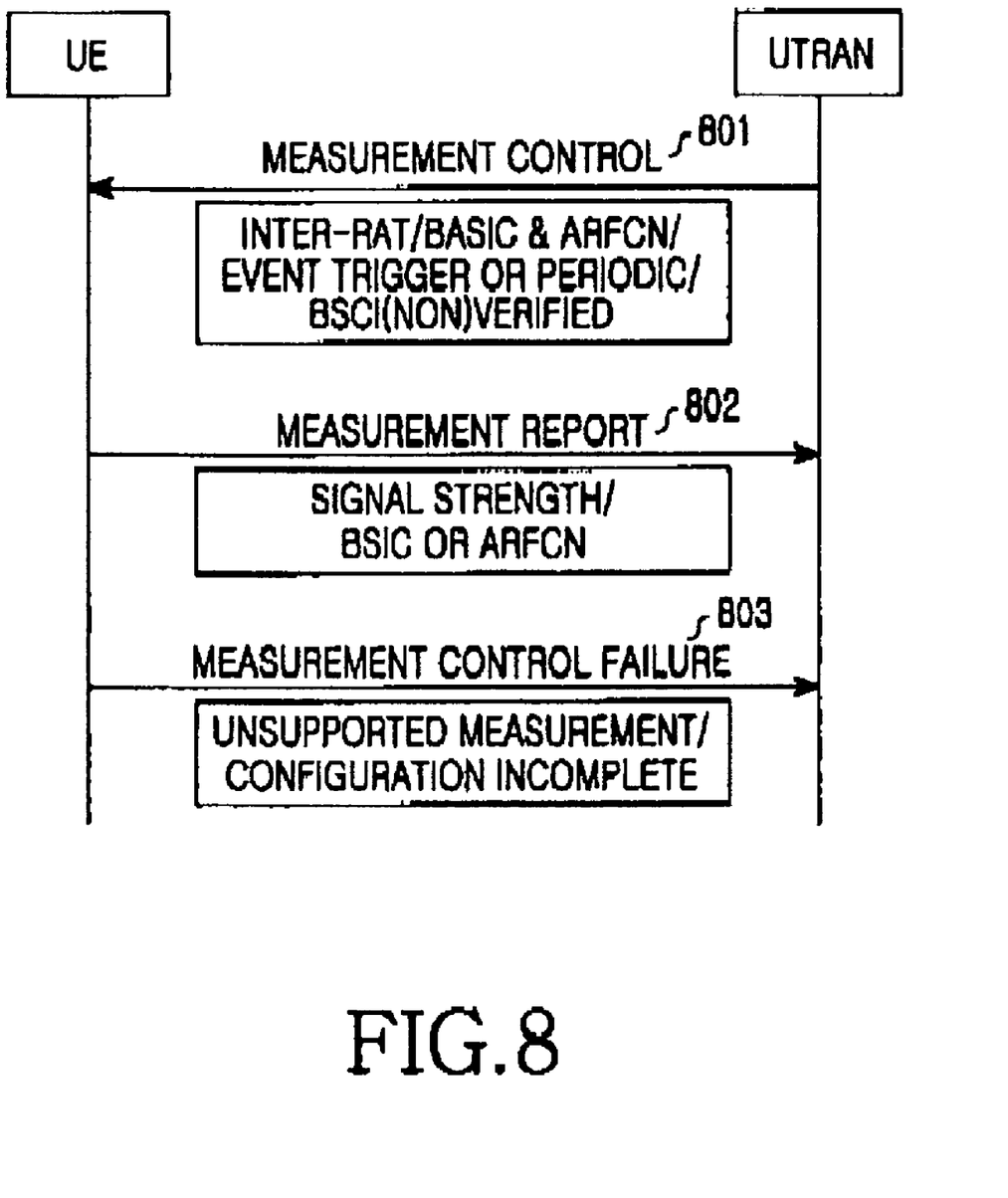
FIG. 8 is a diagram illustrating a conventional signaling procedure for an inter-RAT handover, leading to an inter-RAT measurement failure.

FIG. 8 is a diagram illustrating a signaling procedure when an NB-TDD Node B commands a UE to perform inter-RAT measurements on signals from GSM cells. Referring to FIG. 8, a UTRAN covering the NB-TDD Node B commands the UE to perform inter-RAT measurements on neighbor GSM cells, informing the UE of the BSICs (Base transceiver Station Identity Codes) and ARFCNs (Absolute Radio Frequency Channel Numbers) of the GSM cells in step 801. At the same time, the UTRAN tells the UE how an inter-RAT measurement reporting is to be done and whether BSIC verification is required when reporting. The inter-RAT measurement is reported each time an event is generated (event-triggered mode), or periodically.

The UE then determines whether it can perform the inter-RAT measurements. If it can, the UE performs the inter-RAT measurements and reports them to the UTRAN in step 802. However, if the UE cannot perform the inter-RAT measurements, the UE transmits to the UTRAN a MEASUREMENT CONTROL FAILURE message indicating a measurement failure cause in step 803.

Measurement failure causes are specified as unsupported measurement and configuration incomplete. The former is added to the MEASUREMENT CONTROL FAILURE message when the UTRAN commands an inter-RAT measurement that the UE does not support, while the latter is added to the MEASUREMENT CONTROL FAILURE message when the UTRAN commands the alteration of an ongoing inter-RAT measurement, but the inter-RAT measurement is not done, or a time period in which communication is discontinued for an inter-RAT measurement is occupied for another inter-RAT measurement.

The actual measurement procedure of step 802 is performed differently depending on whether BSIC verification is required, and whether the inter-RAT measurement reporting is periodic or event-triggered.

For ease of description, it is assumed that an inter-RAT measurement command requests the UE to report an inter-RAT measurement with BSIC verification in an event-triggered mode. The UE measures the strengths of signals from all neighbor GSM cells in inter-RAT measurement available TSs using information about the GSM cells (i.e., BSICs and ARFCNs) received together with the inter-RAT measurement command. There is no limit on channels that are measured. The UE simply measures the strengths of arbitrary channel signals from the GSM cells in the TSs. The UE then enumerates the signal strength measurements in a descending order and monitors an FCCH and an SCH from a GSM cell transmitting the strongest signal, thereby identifying the BSIC of the cell. If the BSIC is verified, the UE decides whether a condition given together with the inter-RAT measurement command by the NB-TDD Node B is satisfied. If it is satisfied, the UE reports the signal strength measurement with the verified BSIC to the UTRAN.

The UE then verifies the BSIC of a GSM cell that transmits a second strongest signal by monitoring an FCCH and an SCH from the GSM cell. If the BSIC is successfully verified and the condition is satisfied, the UE reports the signal strength measurement with the BSIC to the UTRAN. The signal strength measurements that satisfy the condition can be reported individually or all together.

In this manner, the UE repeats the inter-RAT measurements on GSM cells whose BSICs can be verified and repeats measurement reporting. The UE also maintains synchronization to some of the GSM cells transmitting strong signals by continuous FCCHs and SCHs monitoring in order to minimize time required for synchronization when the NB-TDD Node B commands a handover to a particular GSM cell. In this event-triggered inter-RAT measurement with BSIC verification, if GSM cells satisfy the condition but their BSICs are not verified, they are excluded from measurement reporting. In other words, inter-RAT measurements are performed on only GSM cells whose BSICs are verified. Accordingly, in the case of a shortage of time to identify BSICs from SCH signals received from all neighbor GSM cells, the UE cannot verify their BSICs and the UTRAN cannot determine whether the cause of inter-RAT measurement failure is the lack of measuring time or the absence of GSM cells satisfying the given condition. As a result, the handover is failed and the UTRAN malfunctions.

Alternatively, if the inter-RAT measurement command requires periodic reporting with BSIC verification, the signal strengths and ARFCNs of corresponding GSM cells are reported even though their BSICs are not verified. In the case of an inter-RAT measurement command not requiring BSIC verification, only the signal strengths are reported.

A distinctive shortcoming of the above-described inter-RAT measurement scenario is that if the NB-TDD Node B commands an event-triggered inter-RAT measurement with BSIC verification, the UE may not verify the BSICs of neighbor GSM cells with its assigned TSs and radio frequency transition time, though it can measure signal strengths of the GSM cells. As a result, the UE fails to report the inter-RAT measurement. However, the NB-TDD Node B cannot identify the cause of the reporting failure as being unsatisfactory received signal strengths with respect to a given condition or failed BSIC verification.

SUMMARY OF THE INVENTION

It is, therefore, an object of the present invention to provide a method of supporting a handover from an NB-TDD mobile communication system to a different mobile communication system.

It is another object of the present invention to provide a method of measuring received signal strengths for a handover from an NB-TDD mobile communication system to a different mobile communication system.

It is a further object of the present invention to provide a method of maintaining synchronization for a handover from an NB-TDD mobile communication system to a different mobile communication system.

It is still another object of the present invention to provide a method of performing an inter-RAT measurement in a UE during a non-UL/DL communication period to implement a handover from an NB-TDD mobile communication system to a different mobile communication system.

The above and other objects are achieved by a method of performing an inter-RAT measurement for a handover from NB-TDD to GSM. A UE, as it moves from an NB-TDD Node B to a GSM cell, receives a measurement control message from the NB-TDD Node B. The UE then measures the strength of a signal received from the GSM cell and verifies its identification for a predetermined measuring time. If the UE successfully verifies the identification of the GSM cell for the measuring time, it reports the signal strength measurement and the verified GSM cell identification to the NB-TDD Node B. If the UE fails to verify the identification of the GSM cell for the measuring time, it reports only the signal strength measurement to the NB-TDD Node B.

The measuring time is determined by at least one DL TS and at least one UL TS among a plurality of TSs forming one sub-frame.

It is preferred that the NB-TDD Node B reassigns new DL and UL TSs to the UE to adjust the measuring time after the UE reports only the signal strength measurement to the NB-TDD Node B.

Also, it is preferred that the adjusted measuring time is longer than before the adjustment.

In addition, it is preferred that the UE receives information about the new DL and UL TSs from the NB-TDD Node B by a physical channel reassignment message or a transport channel reassignment message.

Further, it is preferred that the UE reports to the NB-TDD Node B the signal strength measurement together with the ARFCN (Absolute Radio Frequency Channel Number) of the GSM cell, when it fails to verify the identification of the GSM cell for the measuring time.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides methods of eliminating an inter-RAT measurement failure caused by a shortage of measuring time for an NB-TDD-GSM handover in the following six embodiments.

(1) Embodiment 1: A shortage of BSIC verification time is added as a novel cause of inter-RAT measurement failure. The measuring time shortage is defined as "short idle time", and a value representing short idle time is added to existing measurement failure causes and an additional corresponding operation is configured to be applicable to a short idle time situation.

(2) Embodiment 2: A UTRAN evaluates a capability of a UE with respect to inter-RAT measurement and assigns DL and UL TSs according to the UE's capability. If the current measuring time available to the UE is not enough for normal BSIC verification, the UTRAN adjusts the measuring time by TS reassignment. For this purpose, the UE additionally reports its radio frequency transition time in a new information element (IE), as well as its capability.

(3) Embodiment 3: The UE is supposed to perform an inter-RAT measurement with BSIC verification and report it periodically. If the UE fails to verify BSICs for a predetermined time, the UTRAN reassigns DL and UL TSs to the UE, determining that the measuring time is too short and requests the UE to report the inter-RAT measurement with BSIC verification in an event-triggered mode.

(4) Embodiment 4: A situation leading to shot idle time is prevented. For this purpose, the UTRAN avoids assignment of DL and UL TSs that makes BSIC verification impossible.

(5) Embodiment 5: DL and UL TSs are initially assigned to the UE in a general slot assignment method irrespective of inter-RAT measurement. For an inter-RAT measurement, DL and UL TSs are reassigned to the UE such that a short idle time situation is avoided. Specifically, upon request for a handover from NB-TDD to GSM, DL and UL TSs can be reassigned to the UE.

(6) Embodiment 6: If the UTRAN requires an event-triggered inter-RAT measurement with BSIC verification, the UE reports measurements with corresponding ARFCNs, instead of BSICs, if it fails to verify the BSICs. While the UE cannot re port inter-RAT measurements without BSIC verification in the conventional technology, it can report the measurements even when the BSIC verification is unavailable in this embodiment.

Embodiment 1

Figure 5:
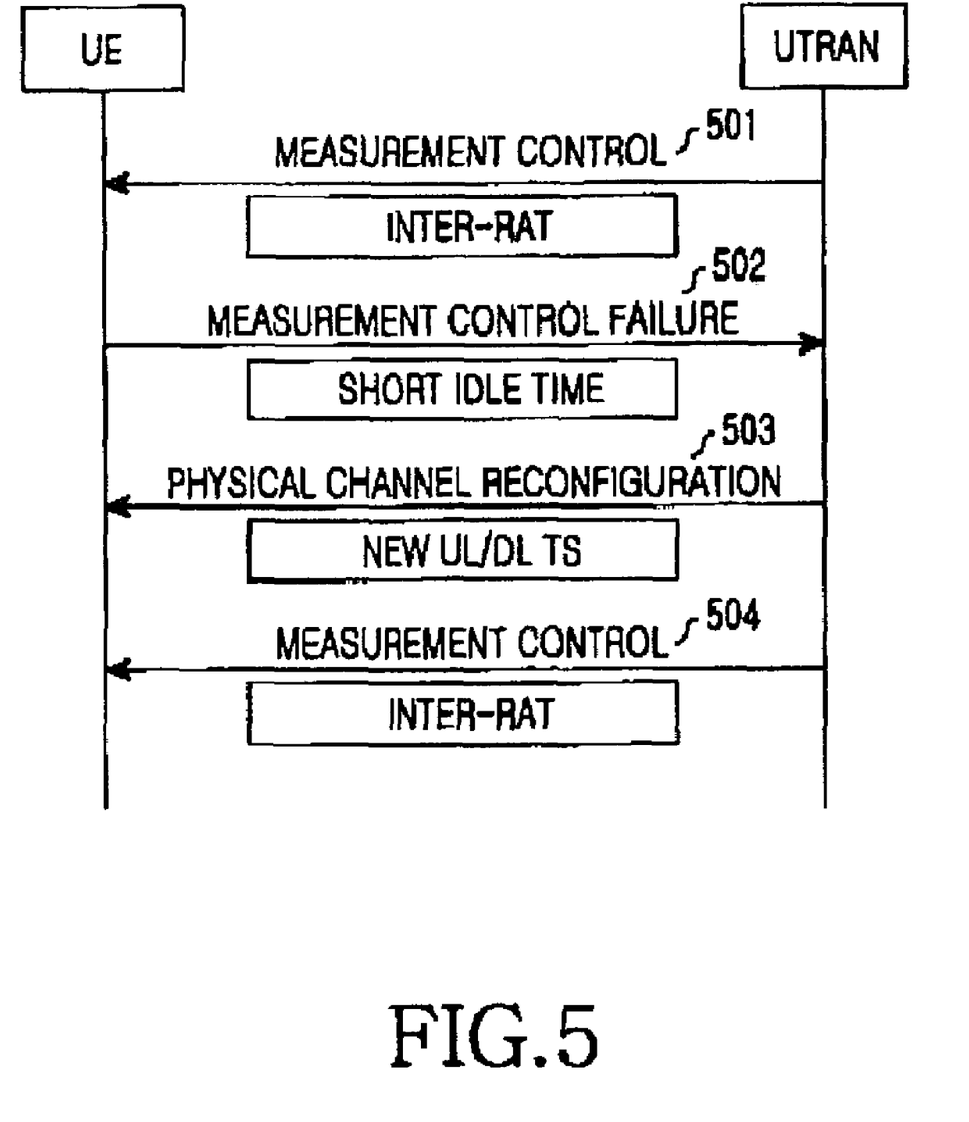
FIG. 5 is a diagram illustrating a signaling procedure for eliminating an inter-RAT measurement failure for an inter-RAT handover according to a first embodiment of the present invention.

An inter-RAT measurement due to a shortage of BSIC verification time (short idle time) is added as a new measurement failure cause and a corresponding operation is additionally performed. FIG. 5 illustrates signaling when a short idle time is additionally defined as a measurement failure cause.

Referring to FIG. 5, the UTRAN transmits a MEASUREMENT CONTROL message commanding an inter-RAT measurement to the UE in communication with the NB-TDD Node B in step 501. The UE receives the MEASUREMENT CONTROL message in a Cell_DCH state. The MEASUREMENT CONTROL message is used for inter-RAT measurement, intra-frequency measurement, inter-frequency measurement, and traffic volume measurement. In the present invention, the MEASUREMENT CONTROL message is confined to inter-RAT measurement, particularly for a handover from the NB-TDD Node B to a GSM cell. The MEASUREMENT CONTROL message includes information about GSM cells and the inter-RAT measurement. The GSM cell information is a neighbor cell list containing up to 32 BSICs and ARFCNs. The inter-RAT measurement information indicates whether BSIC verification is required, and how inter-RAT measurement reporting is carried out. In BSIC verification, the UE is supposed to report a GSM cell from which an event has occurred, verifying its BSIC. However, in non-BSIC verification, the UE reports the GSM cell without verifying its BSIC. The inter-RAT measurement reporting can be carried out periodically or in an event-triggered mode. The event occurs in a handover-requiring situation in the form of a signal having a strength at or above a threshold from at least one neighbor GSM cell.

In non-BSIC verification, the UE reports the inter-RAT measurement to the UTRAN periodically or in an event-triggered mode. Even if BSIC verification and periodic reporting are required, the UE can report the inter-RAT measurement with an ARFCN periodically to the UTRAN without BSIC verification. However, if the UE is requested to report a GSM cell having an event with verification of its BSIC, it determines whether the BSIC of the GSM cell can be verified for a measuring time, considering a radio frequency transition time. If BSIC verification is available, the UE reports the GSM cell with its verified BSIC to the UTRAN. However, if BSIC verification is unavailable, the UE transmits to the UTRAN a MEASUREMENT CONTROL FAILURE message indicating short idle time as a measurement failure cause in step 502. That is, the present invention further defines short idle time as a measurement failure cause in addition to unsupported measurement and configuration incomplete. Situations leading to short idle time are depicted in Table 1 and Table 2. Table 1 shows that when a radio frequency transition time is 0.8 ms or longer, and TS#1 and TS#5 are assigned to the UE, BSIC verification is impossible. It is noted from Table 2 that when a radio frequency transition time is 0.9 ms or longer, and TS#1 and TS#4, TS#2 and TS#5, or TS#3 and TS#6 are assigned to the UE, BSIC verification is impossible.

The UTRAN receives the MEASUREMENT CONTROL FAILURE message and analyzes the cause of the measurement failure in step 502. When identifying the measurement failure cause to be short idle time, the UTRAN assigns new DL and UL TSs to the UE to ensure a measuring time sufficient for BSIC verification. The new DL and UL TSs are spaced by a wider gap than that of DL and UL TSs already assigned to the UE. In step 503, the UTRAN transmits information about the new DL and UL TSs to the UE by a PHYSICAL CHANNEL RECONFIGURATION message, a TRANSPORT CHANNEL RECONFIGURATION message, a RADIO BEARER SETUP message, or a RADIO BEARER RECONFIGURATION message. The UE then changes the existing DL and UL TSs to the new ones. The UTRAN transmits a MEASUREMENT CONTROL message to the UE, requesting an inter-RAT measurement in step 504. Upon receipt of the MEASUREMENT CONTROL message, the UE performs an inter-RAT measurement for a measuring time defined by the new DL and UL TSs.

Embodiment 2

The UTRAN assesses the capability of the UE to perform an inter-RAT measurement before transmitting the MEASUREMENT CONTROL message. The UTRAN then assigns DL and UL TSs to the UE according to its capability. If determining that the UE is not capable of BSIC verification for the current measuring time, the UTRAN adjusts the measuring time by assigning new DL and UL TSs. For this purpose, the UE reports its radio frequency transition time in a novel IE (Information Element) in addition to its capability.

Figure 6:
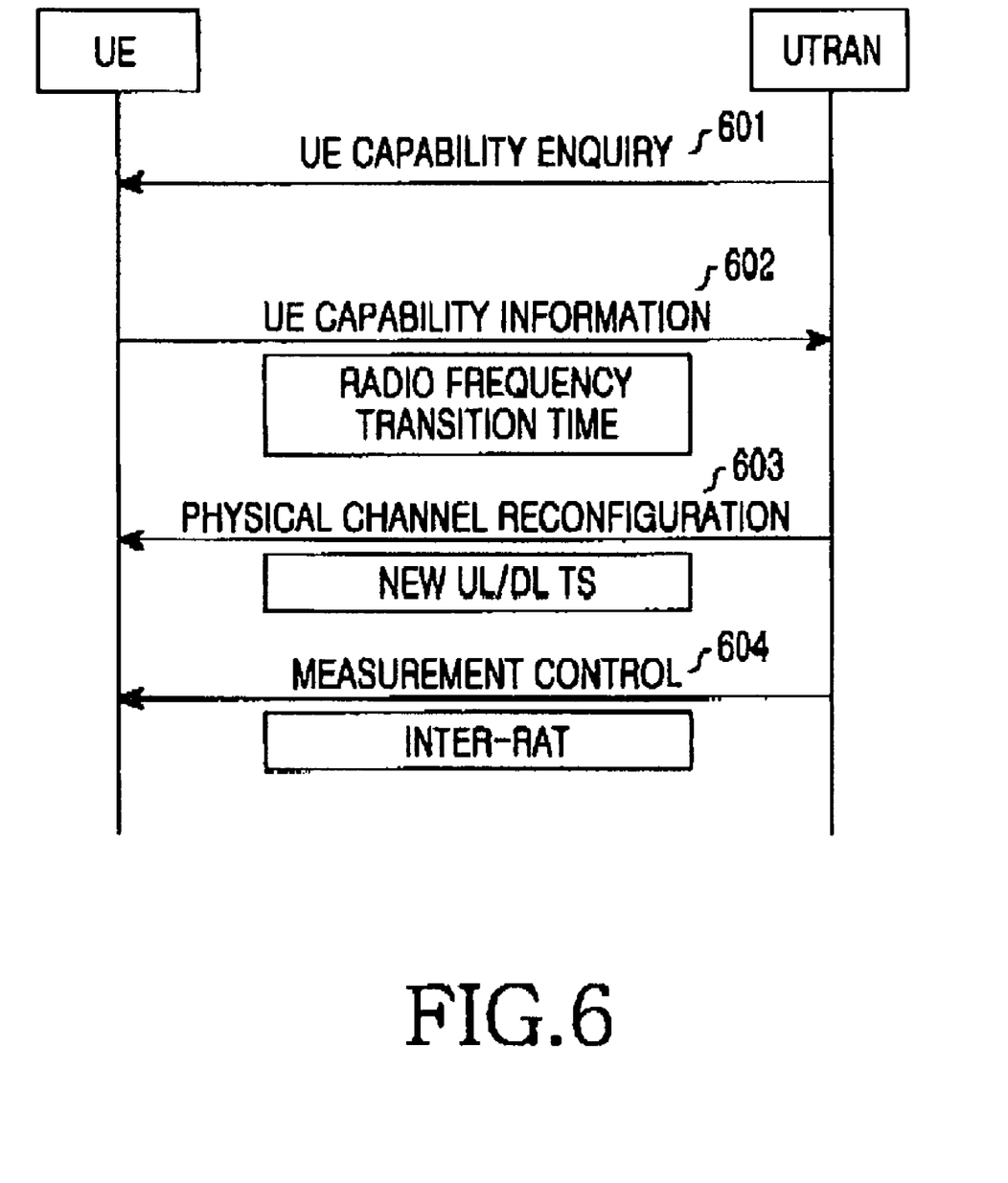
FIG. 6 is a diagram illustrating a signaling procedure for eliminating an inter-RAT measurement failure for an inter-RAT handover according to a second embodiment of the present invention.

FIG. 6 is a diagram illustrating a signaling procedure for the UTRAN to assign new DL and UL TSs to the UE based on a report about the capability of the UE. Referring to FIG. 6, the UTRAN transmits to the UE a UE CAPABILITY ENQUIRY message asking about the UE's capability in step 601. The UE transmits to the UTRAN a UE CAPABILITY INFORMATION message containing information about radio frequency transition time in step 602. The UE CAPABILITY INFORMATION message is delivered in response to the UE CAPABILITY ENQUIRY message received from the UTRAN or when a variable stored in the UE, UE_CAPABILITY_TRANSFERRED, has been changed.

Upon receipt of the UE CAPABILITY INFORMATION message, the UTRAN analyzes the radio frequency transition time information and determines whether existing DL and UL TSs are feasible for BSIC verification with respect to the radio frequency transition time. Examples of inappropriate assignment of DL and UL TSs for BSIC verification with respect to the radio frequency transition time are found in Table 1 and Table 2. Table 1 shows that when a radio frequency transition time is 0.8 ms or longer, and TS#1 and TS#5 are assigned to the UE, BSIC verification is impossible. It is noted from Table 2 that when a radio frequency transition time is 0.9 ms or longer, and TS#1 and TS#4, TS#2 and TS#5, or TS#3 and TS#6 are assigned to the UE, BSIC verification is impossible.

If the assigned DL and UL TSs are not appropriate for the capability of the UE, the UTRAN assigns new DL and UL TSs to the UE in order to ensure a measuring time sufficient for BSIC verification. The new DL and UL TSs are spaced from each other by a wider gap than the existing ones. In step 603, the UTRAN transmits information about the new DL and UL TSs to the UE by a PHYSICAL CHANNEL RECONFIGURATION message, a TRANSPORT CHANNEL RECONFIGURATION message, a RADIO BEARER SETUP message, or a RADIO BEARER RECONFIGURATION message. The UE then changes the existing DL and UL TSs to the new ones. The UTRAN transmits a MEASUREMENT CONTROL message to the UE, requesting an inter-RAT measurement in step 604. Upon receipt of the MEASUREMENT CONTROL message, the UE performs an inter-RAT measurement for a measuring time defined by the new DL and UL TSs.

However, if the reported radio frequency transition time and the existing DL and UL TSs are sufficient for BSIC verification, the UTRAN can omit step 603.

The feature of the second embodiment is reporting of the UE's capability and reassignment of DL and UL TSs based on the UE's capability. Therefore, a measuring time sufficient for BSIC verification is ensured.

Embodiment 3

The UE is supposed to perform an inter-RAT measurement with BSIC verification and report the inter-RAT measurement periodically. If the UE fails to verify BSICs for a predetermined time, it is assigned to new DL and UL TSs and reports the inter-RAT measurement in an event-triggered mode. That is, the UTRAN identifies the cause of the BSIC verification failure as being a short idle time and assigns new DL and UL TSs to the UE.

To implement the third embodiment, two inter-RAT measurement reporting techniques are used in combination. One of them is periodic reporting with BSIC verification and the other is event-triggered reporting with BSIC verification. These two techniques differ in that in case of failed BSIC verification, the inter-RAT measurement is reported together with an ARFCN in the former and no inter-RAT measurement is reported in the latter.

Figure 7:
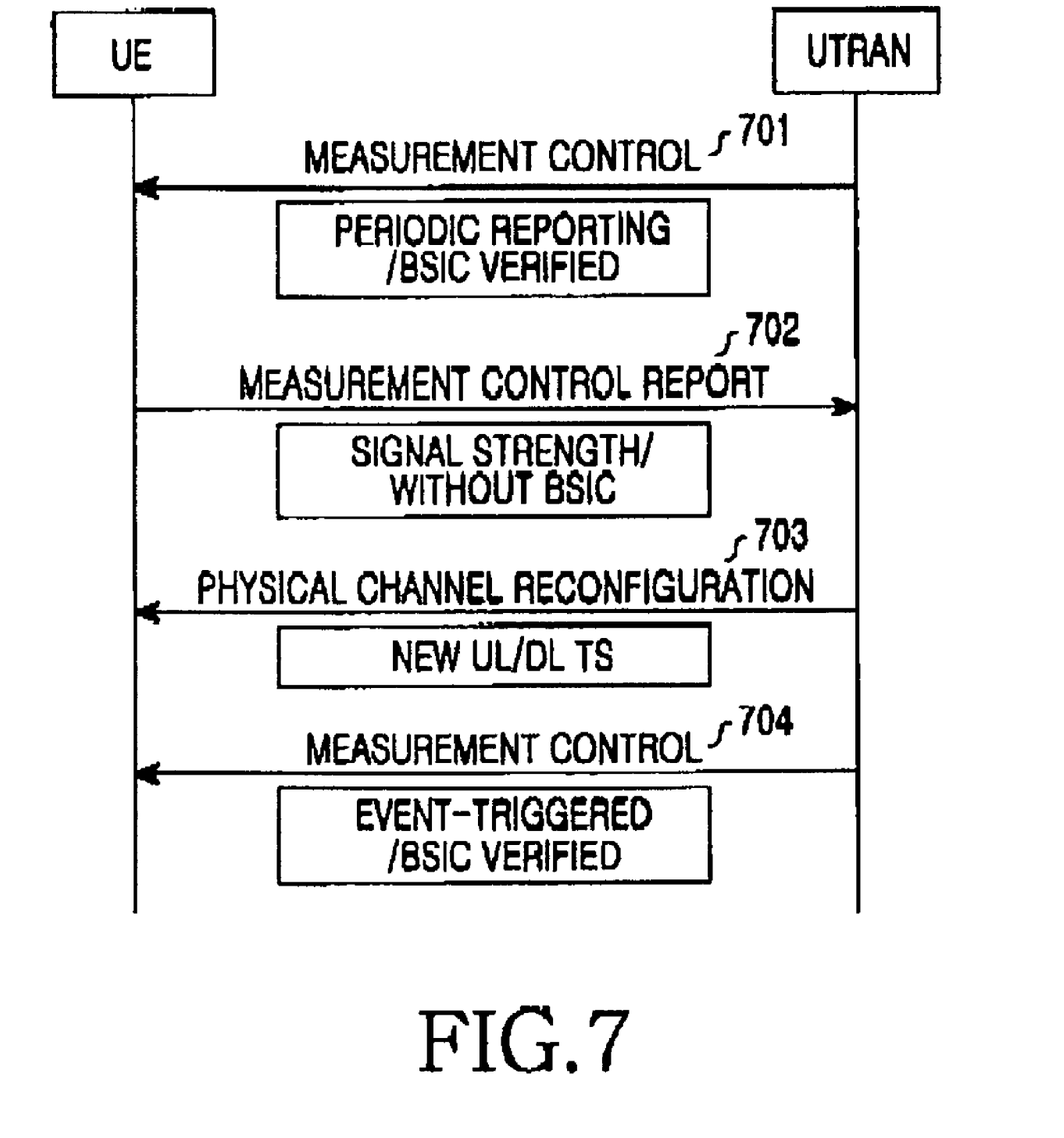
FIG. 7 is a diagram illustrating a signaling procedure for eliminating an inter-RAT measurement failure for an inter-RAT handover according to a third embodiment of the present invention.

FIG. 7 is a diagram illustrating a signaling procedure for assigning new DL and UL TSs by imposing restriction on a given inter-RAT measurement method when the UTRAN identifies short idle time. Referring to FIG. 7, the UTRAN transmits a MEASUREMENT CONTROL message to the UE, requesting periodic reporting with BSIC verification in step 701. The UE then measures the strengths of signals received from neighbor GSM cells and verifies the BSICs of GSM cells that transmit signals having strengths at or above a threshold, for a predetermined time period. The UE reports the verified BSICs and the signal strength measurements to the UTRAN. Here, signaling in the case of BSIC verification is not illustrated in FIG. 7. In the case of non-BSIC verification, the UE transmits the signal strength measurements with corresponding ARFCNs to the UTRAN by, for example, a MEASUREMENT REPORT message in step 702.

The UTRAN, if it has not received the verified BSICs, determines that a measuring time assigned to the UE lacks for BSIC verification, and assigns new DL and UL TSs to the UE to enable a sufficient measuring time. In step 703, the UTRAN transmits information about the reassigned DL and UL TSs to the UE by a PHYSICAL CHANNEL RECONFIGURATION message, a TRANSPORT CHANNEL RECONFIGURATION message, a RADIO BEARER SETUP message, or a RADIO BEARER RECONFIGURATION message. The UE then changes the existing DL and UL TSs to the new ones. The UTRAN transmits a MEASUREMENT CONTROL message to the UE, requesting an event-triggered inter-RAT measurement with BSIC verification in step 704. Upon receipt of the MEASUREMENT CONTROL message, the UE performs an inter-RAT measurement, verifying the BSIC of an event-having GSM cell for a measuring time defined by the new DL and UL TSs and reports it to the UTRAN.

Embodiment 4

The situation that BSIC verification is unavailable due to short idle time is prevented for an inter-RAT measurement. To do so, the UTRAN avoids such assignment of DL and UL TSs to the UE that make BSIC verification impossible.

In accordance with the fourth embodiment of the present invention, the slot combinations that lead to short idle time are excluded from slot assignment. That is, the DL and UL slot combinations illustrated in Table 1 and Table 2 are excluded in slot assignment. For example, TS#1 & TS#5, TS#2 & TS#6, TS#1 & TS#4, TS#2 & TS and TS#3 & TS#6 are not assigned irrespective of radio frequency transition time. To do so, the UTRAN must manage the above TS combinations. Despite the restriction on slot assignment without considering the radio frequency transition time of the UE, signaling is simplified because the UE is not requested to transmit any information.

Embodiment 5

DL and UL TSs are initially assigned to the UE irrespective of inter-RAT measurement and reassigned in an inter-RAT measurement-requiring situation so that a sufficient measuring time can be ensured. The slot reassignment is carried out especially when an NB-TDD-GSM handover occurs.

At the initial slot assignment, even the slot combinations that lead to short idle time, TS#1 & TS#5, TS#2 & TS#6, TS#1 & TS#4, TS#2 & TS#5, and T be assigned. When the UE, having a slot combination incurring short idle time assigned, moves from the NB-TDD Node B to a GSM cell, the UTRAN reassigns DL and UL TSs to the UE, which lengthen a measuring time.

Embodiment 6

Although the UTRAN requests an event-triggered inter-RAT measurement with BSIC verification, the UE reports signal strength measurements together with ARFCNs instead of BSICs when BSIC verification is unavailable, as compared to the conventional inter-RAT measurement method in which the measurement reporting is impossible in case of failed BSIC verification.

Figure 9:
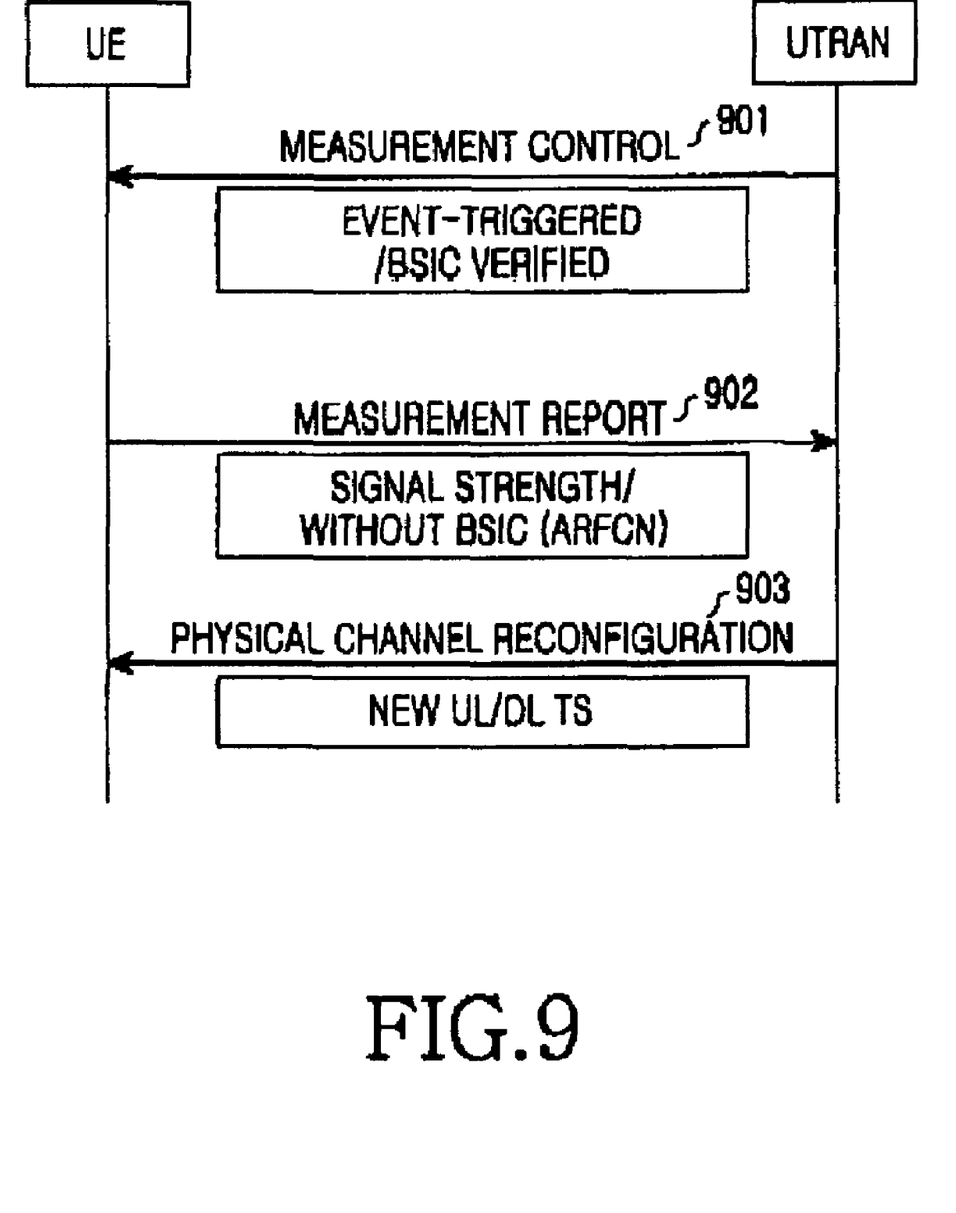
FIG. 9 is a diagram illustrating a signaling procedure for eliminating an inter-RAT measurement failure for an inter-RAT handover according to a sixth embodiment of the present invention.

FIG. 9 is a diagram illustrating a signaling procedure when the UE is allowed to carry out an inter-RAT measurement for an inter-RAT handover if it fails to verify BSICs. Referring to FIG. 9, the UTRAN transmits a MEASUREMENT CONTROL message to the UE, which may be in an NB-TDD-GSM handover situation, requesting event-triggered reporting with BSIC verification in step 901. The UE then determines whether it can verify the BSICs of neighbor GSM cells with assigned DL and UL TSs and its radio frequency transition time.

If BSIC verification is available, the UE measures the strengths of signals received from the neighbor GSM cells and verifies the BSICs of GSM cells that transmit signals having strengths at or above a threshold. Even if BSIC verification is unavailable as illustrated in Table 1 and Table 2, the UE measures the signal strengths. The UE then reports the signal strength measurements with the verified BSICs or corresponding ARFCNs to the UTRAN by a MEASUREMENT REPORT message in step 902. The BSICs are delivered in the case of successful BSIC verification and the ARFCNs in the case of failed BSIC verification. It can be further contemplated that if the BSIC of at least one GSM cell is verified, the UE transmits the received signal strengths of all neighbor GSM cells with the verified BSIC. Also, the UE can transmit only received signal strengths exceeding a threshold.

The UTRAN analyzes the MEASUREMENT REPORT message. If it has received only the ARFCNs, the UTRAN considers that the UE failed to verify BSICs due to short idle time and reassigns DL and UL TSs that ensure a sufficient measuring time for BSIC verification. In step 903, the UTRAN transmits information about the assigned DL and UL slots to the UE by a PHYSICAL CHANNEL RECONFIGURATION message, a TRANSPORT CHANNEL RECONFIGURATION message, a RADIO BEARER SETUP message, or a RADIO BEARER RECONFIGURATION message. The UE then changes the existing DL and UL TSs to the new ones and performs an inter-RAT measurement for the measuring time defined by the new DL and UL TSs.

The six embodiments of the present invention commonly solve the problem of BSIC verification failure due to a short idle time. They can be implemented irrespective of the order of signal strength measuring and BSIC verification. BSIC verification may follow signal strength measuring, or vice versa.

As described above, the present invention advantageously prevents BSIC verification failure arising from a short idle time in an inter-RAT measurement. Also, a UTRAN identifies the accurate cause of an inter-RAT measurement failure and takes an appropriate measure, thereby eliminating the cause. As a result, a handover between heterogeneous systems using different frequencies or different communication schemes is effectively, stably supported.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of measuring a strength of a signal received from a second Node B for a measuring time in which communication is not conducted with a first Node B, verifying an identification of the second Node B, and reporting the signal strength measurement and the verified second Node B identification to the first Node B in a user equipment (UE) that moves from the first Node B to a handover zone between the first and second Node Bs in a mobile communication system, the first and second Node Bs servicing in different communication schemes, the method comprising the steps of:

(1) receiving a measurement control message from the first Node B, the measurement control message requesting the UE to measure the strength of the signal received from the second Node B, verify the identification of the second Node B, and report the signal strength measurement and the verified second Node B identification;

(2) measuring the strength of the signal received from the second Node B for a measuring time and verifying the identification of the second Node B, if the signal strength is equal to or greater than a predetermined threshold;

(3) reporting the signal strength measurement and the verified second Node B identification to the first Node B if the UE successfully verifies the identification of the second Node B;

(4) reporting only the signal strength measurement to the first Node B if the UE fails to verify the identification of the second Node B; and (5) assigning the UE new downlink and uplink time slots from the first Node B to adjust the measuring time.

2. The method of claim 1, wherein the UE receives information about the new downlink and uplink time slots from the first Node B by a physical channel reassignment message.

3. The method of claim 1, wherein the UE receives information about the new downlink and uplink time slots from the first Node B by a transport channel reassignment message.

4. The method of claim 1, wherein the first Node B supports NB-TDD (Narrow Band-Time Division Duplexing) and the second Node B supports GSM (Global System for Mobile communications).

5. The method of claim 1, wherein the measuring time is determined by at least one downlink time slot and at least one uplink time slot among a plurality of time slots forming one sub-frame.

6. The method of claim 1, wherein the UE reports to the first Node B the signal strength measurement together with an ARFCN (Absolute Radio Frequency Channel Number) of the second Node B in step (4).

7. A method of reassigning in a first Node B time slots to a user equipment (UE) that moves from the first Node B to a handover zone between the first Node B and a second Node B according to a report of a signal strength measurement and a verified second Node B identification in a mobile communication system, the first and second Node Bs servicing in different communication schemes and the UE measuring a strength of a signal received from the second Node B for a measuring time in which communication is not conducted with the first Node B, verifying the identification of the second Node B, and reporting the signal strength measurement and the verified second Node B identification to the first Node B, the method comprising the steps of:

transmitting a measurement control message to the UE, the measurement control message requesting the UE to measure the strength of the signal received from the second Node B, verify the identification of the second Node B, and report the signal strength measurement;

reassigning downlink and uplink time slots to the UE and transmitting information about the reassigned time slots to the UE so that the measuring time can be adjusted, if the first Node B receives only the signal strength measurement from the UE for a predetermined time.

8. The method of claim 7, wherein the first Node B transmits to the UE the information about the reassigned downlink and uplink time slots by a physical channel reassignment message.

9. The method of claim 7, wherein the first Node B transmits to the UE the information about the reassigned downlink and uplink time slots by a transport channel reassignment message.

10. The method of claim 7, wherein the first Node B supports NB-TDD (Narrow Band-Time Division Duplexing) and the second Node B supports GSM (Global System for Mobile communications).

11. The method of claim 7, wherein the measuring time is determined by at least one downlink time slot and at least one uplink time slot among a plurality of time slots forming one sub-frame.

12. A method of measuring a strength of a signal received from at least one second Node B for a measuring time in which communication is not conducted with a first Node B, verifying an identification of the second Node B, and reporting the signal strength measurement and the verified second Node B identification to the first Node B in a user equipment (UE) that moves from the first Node B to a handover zone between the first and second Node Bs in a mobile communication system, the first and second Node Bs servicing in different communication schemes, the method comprising the steps of:

receiving a measurement control message from the first Node B, the measurement control message requesting the UE to measure the strength of the signal received from the second Node B, verify the identification of the second Node B, and report the signal strength measurement;

measuring the strength of the signal received from the second Node B for the measuring time and verifying the identification of the second Node B, if the signal strength is equal to or greater than a predetermined threshold;

reporting a measurement failure cause indicating a shortage of the measuring time to the first Node B, if the UE measures the signal strength equal to or greater than the threshold and cannot verify the identification of the second Node B; and assigning the UE new downlink and uplink time slots from the first Node B to adjust the measuring time.

13. The method of claim 12, wherein the UE receives information about the new downlink and uplink time slots from the first Node B by a physical channel reassignment message.

14. The method of claim 12, wherein the UE receives information about the new downlink and uplink time slots from the first Node B by a transport channel reassignment message.

15. The method of claim 12, wherein the first Node B supports NB-TDD (Narrow Band-Time Division Duplexing) and the second Node B supports GSM (Global System for Mobile communications).

16. The method of claim 12, wherein the measuring time is determined by at least one downlink time slot and at least one uplink time slot among a plurality of time slots forming one sub-frame.

17. A method of determining in a user equipment (UE) a measuring time required to measure a strength of a signal received from at least one second Node B, verifying an identification of the second Node B, and reporting the signal strength measurement and the verified second Node B identification to a first Node B in a mobile communication system, the first and second Node Bs servicing in different communication schemes and the UE moving from the first Node B to a handover zone between the first and second Node Bs, the method comprising the steps of:

measuring the strength of the signal received from the second Node B upon request of the first Node B and reporting a capability of verifying the identification of the second Node B to the first Node B; and assigning new downlink and uplink time slots from the first Node B according to the reported capability to adjust the measuring time.

18. The method of claim 17, wherein the UE receives information about the new downlink and uplink time slots from the first Node B by a physical channel reassignment message.

19. The method of claim 17, wherein the UE receives information about the new downlink and uplink time slots from the first Node B by a transport channel reassignment message.

20. The method of claim 17, wherein the first Node B supports NB-TDD (Narrow Band-Time Division Duplexing) and the second Node B supports GSM (Global System for Mobile communications).

21. The method of claim 17, wherein the measuring time is determined by at least one downlink time slot and at least one uplink time slot among a plurality of time slots forming one sub-frame.

22. A method of reporting signal strength measurements of GSM (Global System for Mobile communications) cells satisfying a predetermined condition in a predetermined frequency band for an NB-TDD (Narrow Band-Tide Division Duplexing)-GSM handover and verified identifications of the GSM cells to a Node B of an NB-TDD communication system in a user equipment (UE) that moves from the NB-TDD Node B to a handover zone between the NB-TDD Node B and a GSM cell of a GSM communication system, the NB-TDD communication system using a frame structure in which each sub-frame includes a plurality of time slots, and at least one downlink time slot and at least one uplink time slot are assigned to one UE, the method comprising the steps of:

receiving from the NB-TDD Node B a measurement control message requesting the UE to report the signal strength measurements of the GSM cells satisfying the predetermined condition in the predetermined frequency band and the verified identifications of the GSM cells;

measuring the signal strength measurements of the GSM cells satisfying the predetermined condition irrespective of the verification of the identifications of the GSM cells that is carried out for a measuring time determined by time slots assigned to the UE; and assigning the UE new downlink and unlink time slots from the NB-TDD Node B to adjust the measuring time.

23. The method of claim 22, wherein the UE receives information about the new downlink and uplink time slots from the NB-TDD Node B by a physical channel reassignment message.

24. The method of claim 22, wherein the UE receives information about the new downlink and uplink time slots from the NB-TDD Node B by a transport channel reassignment message.

25. A method of performing an inter-RAT (Radio Access Technology) measurement for a handover for a predetermined measuring time in a user equipment (UE) that moves from an NB-TDD (Narrow Band-Time Division Duplexing) communication system to a GSM (Global System for Mobile communications), comprising the steps of:

determining whether a UTRAN (UMTS Terrestrial Radio Access Network) requests an inter-RAT measurement with verification of identification code of a GSM cell, upon request for the inter-RAT measurement from the UTRAN;

determining that a measuring time for verifying the identification code of the GSM cell is too short;

transmitting a message containing an ARFCN (Absolute Radio Frequency Channel Number) of the GSM cell to the UTRAN, if the UE fails to verify the identification code of the GSM cell; and receiving information about reassigned time slots from the UTRAN.

* * * * *